Jan. 30, 1940.                O. SEVERSON                2,188,742
                              TOOL HOLDER
                           Filed March 2, 1939

INVENTOR
OLE SEVERSON
BY *H. T. Sperry*
ATTORNEY

Patented Jan. 30, 1940

2,188,742

UNITED STATES PATENT OFFICE 2,188,742

TOOL HOLDER

Ole Severson, Shelton, Conn., assignor to The Apex Tool & Cutter Company, Inc., a corporation of Connecticut Application March 2, 1939, Serial No. 259,368

1 Claim. (Cl. 29—99)

It is among the prime objects of the present invention to provide a tool holder which, through cooperation with its tool head, will act to hold a tool bit with an improved rigidity ensuring minimum vibration, or chatter, between the holder and its supporting head.

Another object is to provide a tool holder which will have both a side and bottom support and bearing against the tool head in addition to the usual support and bearings of such devices.

Another object is to provide a tool holder which will minimize the over-hang of the tool with respect to its tool head.

Other objects include the provision of a tool holder which carries out the foregoing advantages in a novel, simple device particularly designed to meet the demands of economic manufacture.

A further object of the present invention is to provide a device carrying further the principles set forth in my prior patent 2,031,334 by providing double backing supports and bearings.

Numerous other objects and advantages of the invention will be apparent from a consideration of the present invention taken in connection with the accompanying drawing in which.

Figures 1, 2:
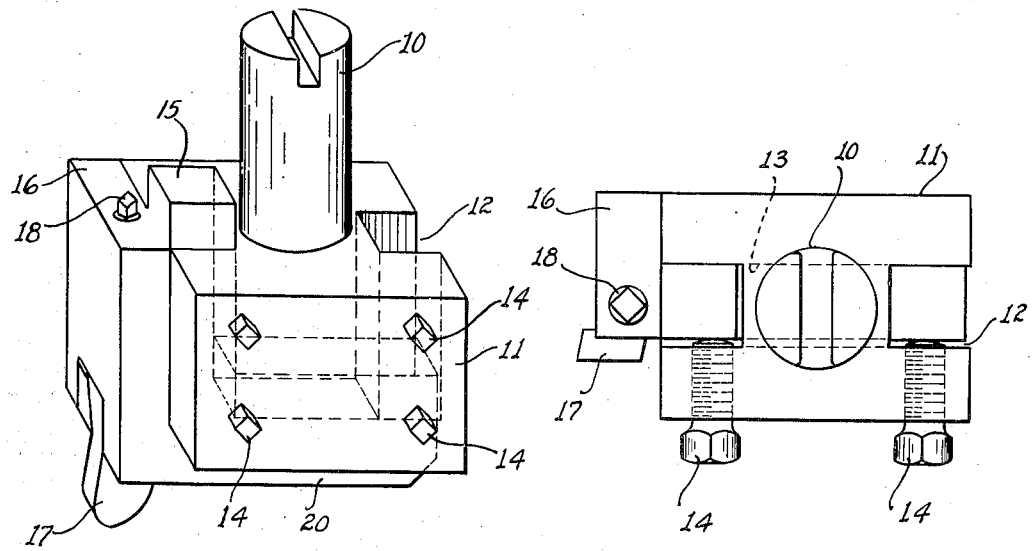
Figure 1 is a side elevation of one form of the invention assembled with its tool head.
Figure 2 is a plan view of Figure 1.

Referring to Figure 1 of the drawing, a tool head or post of conventional form is illustrated, including a shank 10 and tool head body 11, which is provided with angularly walled tool holder receiving recesses 12 on either side and a bottom recess 13. Locking screws 14, are adapted to secure a tool holder shank within the recesses.

Figure 3:
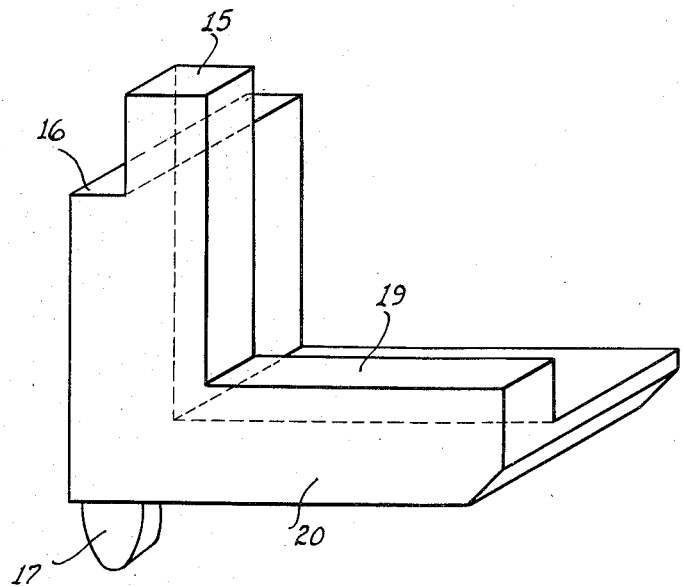
Figure 3 is a perspective view of the holder and bit removed from the tool head.

The tool holder of the present invention includes a shank 15 adapted to fit within the recesses 12 and to be secured therein by the screws 14. As distinct from the conventional holder, in which the bit is secured in axially alignment with the shank, the present holder has an off-set tool holder head 16 which, by reference to Figures 2 and 3, will be seen to be off-set in two directions from the shank 15. Thus, with the shank 15 positioned within the head 11, the back face of the tool holder head will bear against the outer face of the tool head body. The construction is such that the shank and the tool holder head are both substantially rectangular in shape, the head being stepped and juxtaposed with respect to the shank.

This arrangement permits the holder shank to be wholly received within the recesses 12 so that the tool holder head has a side support bearing against the face of the tool head whereby overhang is minimized and an added rigidity of the tool head to the holder union is provided.

The tool holder of my present invention further includes a right angularly extending secondary shank 19 adapted to fit within the bottom recess 13. Associated with this bottom shank 19 is a bottom off-set flange 20 shown as a right angle extension of the head 16. This arrangement not only permits the end of the shank 19 to be secured by one of the screws 14 but also permits the upper face of the flange 20 to bear against the bottom face of the head or post 11 so that a double and right angularly related bearing for the tool holder is provided.

In that form of the invention, the structure holding the bit 17 in the holder body includes a holder platform (not shown) operated from a draw-bolt 18. This construction being in accordance with my co-pending application, Serial No. 737,701, entitled Draw-bolt, tool holder and bit, filed July 31, 1934. However, it will be distinctly understood that this particular bit holding construction forms no part of the present invention. The invention relates to the double directional off-set of the holder head with respect to the holder shank so that the head will protrude beyond the shank to bear against the outer face of the tool head. Obviously any preferred type of bit holding construction may be provided without departing from the spirit or scope of the invention as outlined in the pending claim.

Having set forth the nature of my invention, what I claim is:

A tool holder comprising an elongated rectangular shank adapted to be received within a tool post and having an integrally formed head extending from the front face of the shank and being offset forwardly and to one side with respect to said shank so as to extend beyond the front face and one side wall of said shank, providing said head with a rear wall parallel to and oppositely facing the plane of said front face thus to form a surface adapted to abut the front face of a tool post within which said shank is secured, and having a similar supplemental shank integrally formed with said first mentioned shank and extending right angularly therefrom, and a similar offset head carried by said supplemental shank providing parallel to and oppositely facing the plane of a tool post surface right angularly related to the front surface and forming a surface adapted to abut said right angularly related surface.

OLE SEVERSON.